United States Patent [19]

Itonaga et al.

[11] Patent Number: 4,695,162

[45] Date of Patent: Sep. 22, 1987

[54] FILM THICKNESS MEASURING APPARATUS

[75] Inventors: Makoto Itonaga, Yokohama; Kanji Kayanuma, Hatano, both of Japan

[73] Assignee: Victor Company of Japan, Ltd., Japan

[21] Appl. No.: 736,938

[22] Filed: May 22, 1985

[30] Foreign Application Priority Data

May 24, 1984 [JP] Japan ............................ 59-104920
Jun. 15, 1984 [JP] Japan ............................ 59-123312

[51] Int. Cl.[4] ................................................ G01J 4/00
[52] U.S. Cl. .................................... 356/369; 356/138
[58] Field of Search ............. 356/365, 369, 138, 153, 356/154, 381, 382

[56] References Cited

U.S. PATENT DOCUMENTS

| 3,880,524 | 4/1975 | Dill et al. ........................ 356/369 |
| 3,985,447 | 10/1976 | Aspnes ............................ 356/369 |
| 4,298,281 | 11/1981 | Schave ............................ 356/138 |
| 4,466,739 | 8/1984 | Kasner et al. .................... 356/138 |

OTHER PUBLICATIONS

IBM Journal of Research & Development, vol. 17, Nov. 1973, pp. 472–489, New York, U.S.; P.S. Hague et al.: "Design and Operation of ETA, an Automated Ellipsometer".

Journal of the Optical Society of America, vol. 52, Sep., 1962, pp. 970–977, American Institute of Physics, New York, U.S.; R. J. Archer: "Determination of properties of films on silicon by the method of ellipsometry".

Applied Optics, vol. 11, No. 11, Nov. 1972, pp. 2534–2539, American Institute of Physics, New York, U.S.; R. O. Denicola et al.: "Epitaxial Layer Thickness Measured by Far Infrared Ellipsometry".

Applied Optics, vol. 20, No. 22, Nov. 15th, 1981, pp. 3821–3822, Optical Society of America, New York, U.S. J. P. Mdy: "Immersion Ellopsometry".

*Primary Examiner*—R. A. Rosenberger
*Attorney, Agent, or Firm*—Andrus, Sceales, Starke & Sawall

[57] ABSTRACT

A film thickness measuring apparatus comprises a light source for impinging light on a measuring plate with a predetermined incident angle $\theta_0$, where the measuring plate comprises a transparent film on top of a transparent substrate and the transparent film has a film thickness which is to be measured by the film thickness measuring apparatus, a light receiving system for receiving and detecting light which is impinged on the measuring plate and is reflected thereby, and an analyzer system responsive to an output of the light receiving system for measuring an angle $\Delta$ of the phase difference between two polarized light components of the reflected light from the measuring plate and for calculating the film thickness of the transparent film from the angle $\Delta$ of the phase difference. The incident angle $\theta_0$ of the light from the light source with respect to the measuring plate is selected equal to or approximately equal to a polarizing angle $\theta_b$ of the transparent film of the measuring plate.

5 Claims, 7 Drawing Figures

FILM THICKNESS MEASURING APPARATUS

BACKGROUND OF THE INVENTION

The present invention generally relates to apparatuses for measuring the thickness of films, and more particularly to a film thickness measuring apparatus which is designed to easily measure the thickness of a transparent film provided on a transparent substrate.

Conventionally, a general film thickness measuring apparatus which uses the polarization analysis method as the operating principle thereof, impinges light from a light source on a measuring plate with an arbitrarily selected incident angle. The measuring plate is formed with a transparent film on top of a transparent substrate, and the thickness of the transparent film is to be measured. The light reflected from the measuring plate is detected in a detector of the film thickness measuring apparatus, and a detection output of the detector is analyzed in an analyzer system so as to measure the film thickness of the transparent film.

In this type of a film thickness measuring apparatus, the film thickness is not measured immediately. First, an amplitude ratio tan $\psi$ and a phase difference $\Delta$ between two mutually perpendicular polarized light components of the reflected light which is obtained when the incident light is reflected by the measuring plate, are measured. On the other hand, different values for the film thickness are successively substituted into a predetermined equation which has a film thickness d as the parameter and will be described later on in the specification, so as to obtain the amplitude ratio and the phase difference between the two polarized light components by calculation. It is assumed that the value for the film thickness d which is substituted into the predetermined equation is the thickness of the transparent film which is measured, when the calculated amplitude ratio and the calculated phase difference are equal to the measured amplitude ratio and the measured phase difference, respectively (with an error within a tolerance).

However, according to the conventional film thickness measuring apparatus, when the amplitude ratio and the phase difference are taken along the X and Y coordinates and the film thickness obtained with respect to the amplitude ratio and the phase difference is plotted, the collection of the plots form an oval shape as will be described later in conjunction with a drawing. Thus, as may be readily understood, two values for the film thickness exists with respect to one phase difference, for example. For this reason, the film thickness cannot be obtained solely from the phase difference, and the film thickness must always be obtained from the amplitude ratio and the phase difference. Further, even when the amplitude ratio and the phase difference changes slightly in value, the value of the film thickness which is obtained changes greatly. As a result, there are disadvantages in that the film thickness measuring accuracy is poor, and that it takes a considerably long time to perform calculations and the like for obtaining the film thickness.

SUMMARY OF THE INVENTION

Accordingly, it is a general object of the present invention to provide a novel and useful film thickness measuring apparatus in which the disadvantages described heretofore are eliminated.

Another and more specific object of the present invention is to provide a film thickness measuring apparatus which impinges light from a light source on a transparent film with an incident angle equal to or approximately equal to a polarizing angle which is determined by the refractive index of the transparent film and measures light reflected by the transparent film. According to the apparatus of the present invention, when the film thickness obtained with respect to the amplitude ratio and the phase difference of two polarized light components of the reflected light is plotted, the plots of the film thickness are distributed to form an extremely gently-sloping mountain-shape with respect to all angles (0° to 360°) of the phase difference. Accordingly, a single value for the film thickness can be calculated by measuring only the angle of the phase difference, for example, and the calculation can be performed easily. Further, since the rate of change in the film thickness with respect to the change in the phase difference is small, the film thickness can be obtained with a satisfactory accuracy even when there is a slight error in the value of the phase difference.

Still another object of the present invention is to provide a film thickness measuring apparatus in which the above incident angle can be easily adjusted to become equal to the above polarizing angle by use of an adjusting instrument.

Other objects and further features of the present invention will be apparent from the following detailed description when read in conjunction with the accompanying drawings.

DETAILED DESCRIPTION

Figure 1:
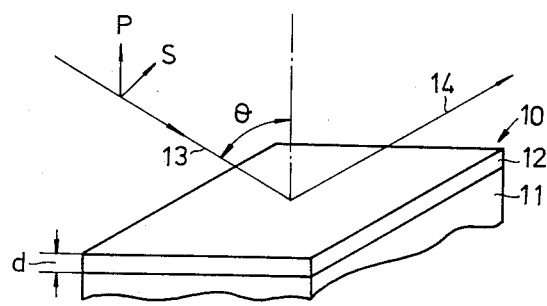
FIG. 1 is a diagram for explaining a measuring plate and the polarized light.

In FIG. 1, a measuring plate 10 comprises a transparent film 12 formed on top of a transparent substrate 11. The transparent film 12 has a thickness d which is to be measured. When incident light 13 is impinged on the measuring plate 10 with an incident angle $\theta$, a part of the incident light 13 is reflected by the surface of the transparent film 12. The remaining part of the incident light 13 enters within the transparent film 12 and is reflected by the surface of the transparent substrate 11, and is then directed out of the transparent film 12 as reflected light 14. When a direction including the incident plane of light is represented by P (P-axis) and a direction perpendicular to the direction P is represented by S (S-axis), the polarization state of light can be described by a superposition of vibrations of light in two planes in the directions P and S.

For example, the transparent film 12 of the measuring plate 10 is a photoresist film which is formed on top of the transparent substrate 11. The transparent substrate 11 is a glass substrate, for example. The extinction coefficient (k) of the transparent film 12 and the transparent substrate 11 is equal to zero or an extremely small value.

The reflected light 14 is subjected to the effects of the thin film interference. Thus, when a Fresnel reflection coefficient of the measuring plate 10 with respect to the incident light 13 having the plane of vibration in the direction P is represented by $R_p$ and a Fresnel reflection coefficient of the measuring plate 10 with respect to the incident light 13 having the plane of vibration in the direction S is represented by $R_s$, the reflection coefficients $R_p$ and $R_s$ are dependent on the film thickness d. In other words, the reflection coefficients $R_p$ and $R_s$ are described by Fresnel reflection coefficients of air, the transparent film 12, and the transparent substrate 11. The reflection coefficients $R_p$ and $R_s$ can be described by the following complex numbers when equations describing the Fresnel reflection coefficients are substituted into the reflection coefficients $R_p$ and $R_s$.

$$R_p = r_p \exp(i\Delta_p) \quad (1)$$

$$R_s = r_s \exp(i\Delta_s) \quad (2)$$

The above equations (1) and (2) indicate that with respect to the incident light 13, the amplitude of the reflected light 14 becomes $r_p$ times and $r_s$ times in the direction P and S, respectively, and the phase of the reflected light 14 shifts by $\Delta_p$ and $\Delta_s$ in the directions P and S, respectively. A ratio of the reflection coefficients $R_p$ and $R_s$ can be described by the following equation (3).

$$R_p/R_s = [r_p \exp(i\Delta_p)]/[r_s \exp(i\Delta_s)] \quad (3)$$
$$= (r_p/r_s)\exp[i(\Delta_p - \Delta_s)]$$

The following equation (4) is obtained when $r_p/r_s = \tan \psi$ and $\Delta_p - \Delta_s = \Delta$ are substituted into the equation (3).

$$R_p/R_s = \tan \psi \exp(i\Delta) \quad (4)$$

The term $\tan \psi$ describes a ratio of the amplitudes of the polarized light components of the reflected light 14 in the directions P and S, and the term $\Delta$ describes a phase difference between the polarized light components in the directions P and S. Since the reflection coefficients $R_p$ and $R_s$ are dependent on the film thickness d, the ratio $R_p/R_s$ is also dependent on the film thickness d.

In order to obtain the film thickness d, the reflected light 14 is detected, and the amplitude ratio $\tan \psi$ and the phase difference $\Delta$ are measured in a conventionally known analyzing system. A ratio of the reflection coefficients is obtained by substituting the measured values into the equation (4). On the other hand, an arbitrary value for the film thickness d is substituted into an equation which is obtained by obtaining the real number portion of the equation (4) (this equation includes the film thickness d as a parameter), and the value which is obtained is compared with the value which is obtained by substituting the measured values. When the two values are not equal to each other, different values for the film thickness d are successively substituted into the equation until the two values become equal to each other with the error being within a tolerance. The value of the film thickness d which is substituted into the equation when the two values become equal to each other, is the value of the film thickness which is to be obtained.

Figure 3:
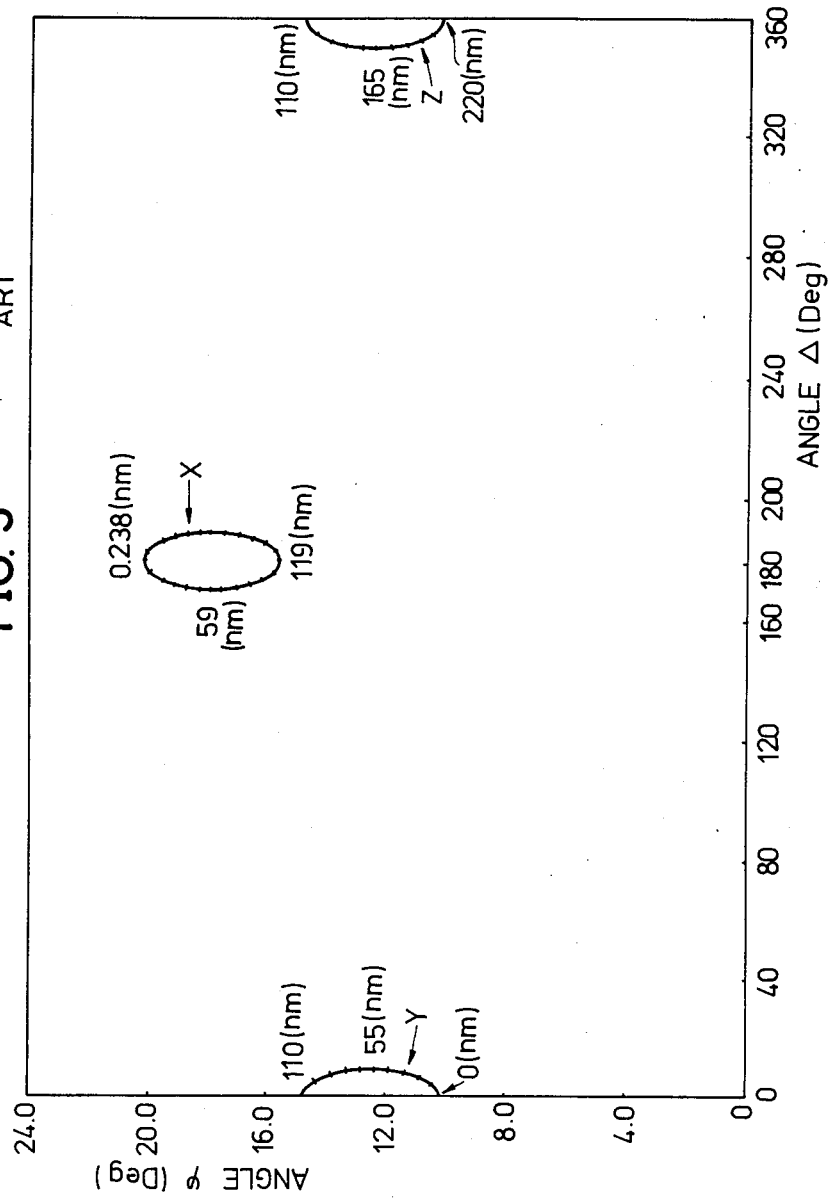
FIG. 3 shows the relationships of the angle of the phase difference and the angle describing the amplitude ratio of two polarized light components and the film thickness obtained in a conventional film thickness measuring apparatus.

The relationships of the angle $\Delta$ of the phase difference, the angle $\psi$ describing the amplitude ratio $\tan \psi$, and the film thickness d in the conventional film thickness measuring apparatus are shown in FIG. 3. In FIG. 3, an oval X is obtained by plotting the film thickness corresponding to the angles $\Delta$ and $\psi$ when the incident angle $\theta$ is selected to 70° and the refractive index of the transparent film 12 is equal to 1.63 and the refractive index of the transparent substrate 11 is equal to 1.52. For example, when the angle $\Delta$ is equal to 180° and the angle $\psi$ is equal to 20.8°, the film thickness d of the transparent film 12 is equal to zero or 238 nm. The film thickness d is equal to 119 nm when the angle $\Delta$ is equal to 180° and the angle $\psi$ is equal to 15.8°, and the film thickness d is equal to 59 nm when the angle $\Delta$ is equal to 170° and the angle $\psi$ is equal to 18.3°. On the other hand, when the incident angle $\theta$ is selected to 50°, the collection of plots of the film thickness d forms an oval Y. The collection of plots of the film thickness d forms an oval Z when the incident angle $\theta$ is selected to 60°. The longer radius of the oval formed by the collection of plots of the film thickness d changes when the refractive index of the transparent film 12 changes.

The film thickness d has a constant period with respect to the angles $\Delta$ and $\psi$ and two values for the film thickness d exist with respect to one angle $\Delta$, for the following reason. That is, in the case where the length of the optical path of the incident light 13 passing through the transparent film 12 is equal to the wavelength of the incident light 13, the reflected light 14 is the same as the incident light 13 with one period thereof less. Hence, the true value for the film thickness d can be described by the following equation (5), where m=0, 1, 2, ... and D represents the measured film thickness in nm.

$$d = D + (238 \times m) \quad (5)$$

Therefore, according to the conventional film thickness measuring apparatus, two values for the film thickness exist with respect to one value of the angle $\Delta$, and the two angles $\Delta$ and $\psi$ must be measured the film thickness d must be obtained from the measured values in order to specify the film thickness d. For this reason, there are disadvantages in that the operation of obtaining the film thickness d is troublesome to perform and it takes a long time to perform the calculations. In addition, the change in the film thickness d is large with respect to a change in the angle $\Delta$. For example, in the case where the incident angle $\theta$ is equal to 70°, the film thickness d changes within a large range of zero to 238 nm even when the angle $\Delta$ changes slightly within a range of 170° to 190°. Accordingly, there is a disadvantage in that it is difficult to accurately obtain the film thickness d.

Figure 2:
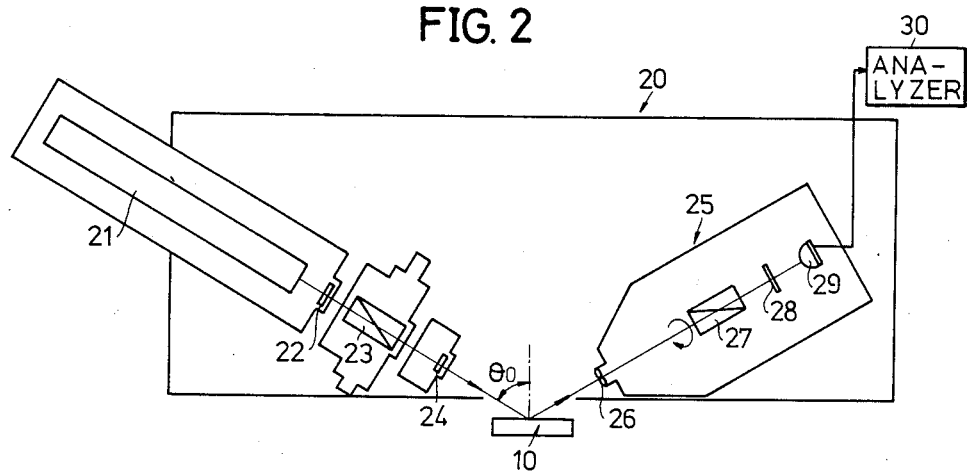
FIG. 2 generally shows an embodiment of the film thickness measuring apparatus according to the present invention.

The present invention has eliminated the disadvantages of the conventional film thickness measuring apparatus described heretofore, and a description will now be given with respect to an embodiment of the film thickness measuring apparatus according to the present invention. The embodiment of the film thickness measuring apparatus according to the present invention is shown generally in FIG. 2.

A film thickness measuring apparatus 20 comprises a light source 21 comprising a HeNe laser, for example. Laser light from the light source 21 is successively passed through a λ/4 plate 22, a polarizer 23, and a λ/4 plate 24, and is impinged on the upper surface of the measuring plate 10 with an incident angle $\theta_0$. The light source 21, the λ/4 plates 22 and 24, and the polarizer 23 are unitarily placed on a support (not shown). The support is set so that the light from the light source 21 impinges on the measuring plate 10 with the incident angle $\theta_0$ which assumes a predetermined value which will be described later. However, it is desirable for the support to be constructed so that minute adjustments can be made when setting the support.

The incident light is reflected by the measuring plate 10 and is subjected to the thin film interference. The reflected light is directed towards a light receiving system 25. The light receiving system 25 comprises a pin hole 26, a rotational analyzer 27, a pin hole 28, and a photodetector 29. The rotational analyzer 27 rotates, and the reflected light is subjected to a time base conversion by the rotational analyzer 27. Hence, a time-sequential output is obtained from the photodetector 29. The light receiving system 25 is known as a light receiving system employing the rotating analyzer method. The light receiving system 25 is not limited to the above, and a light receiving element having a known construction and employing the Wollaston prism method, the rotary phase plate method, the extinction method and the like may be used for the light receiving system 25. The output of the light receiving system 25 is supplied to a known analyzer system 30 wherein an analysis is performed and the angles Δ and ψ are obtained. An example of the analyzer system is described in an article "Design and Operation of ETA, and Automated Ellipsometer" by P. S. Hauge and F. H. Dill in IBM. J. Res. Dev. 17, pages 472–489 published November 1973. For the purpose of measuring the film thickness in the apparatus according to the present invention, it is sufficient to obtain only the angle Δ and the angle ψ need not be obtained, as will be described later.

In the film thickness measuring apparatus according to the present invention, the incident angle $\theta_0$ of the incident light to the measuring plate 10 from the light source 21 is selected to an angle equal to or approximately equal to the polarizing angle (Brewster angle) of the transparent film 12, which polarizing angle is determined by the refractive index of the transparent film 12 of the measuring plate 10. The polarizing angle $\theta_b$ can be described by the following equation when it is assumed that there is no light absorption by the transparent film 12, where n represents the refractive index of the transparent film 12.

$$\theta_b = \tan^{-1} n$$

Figure 4:
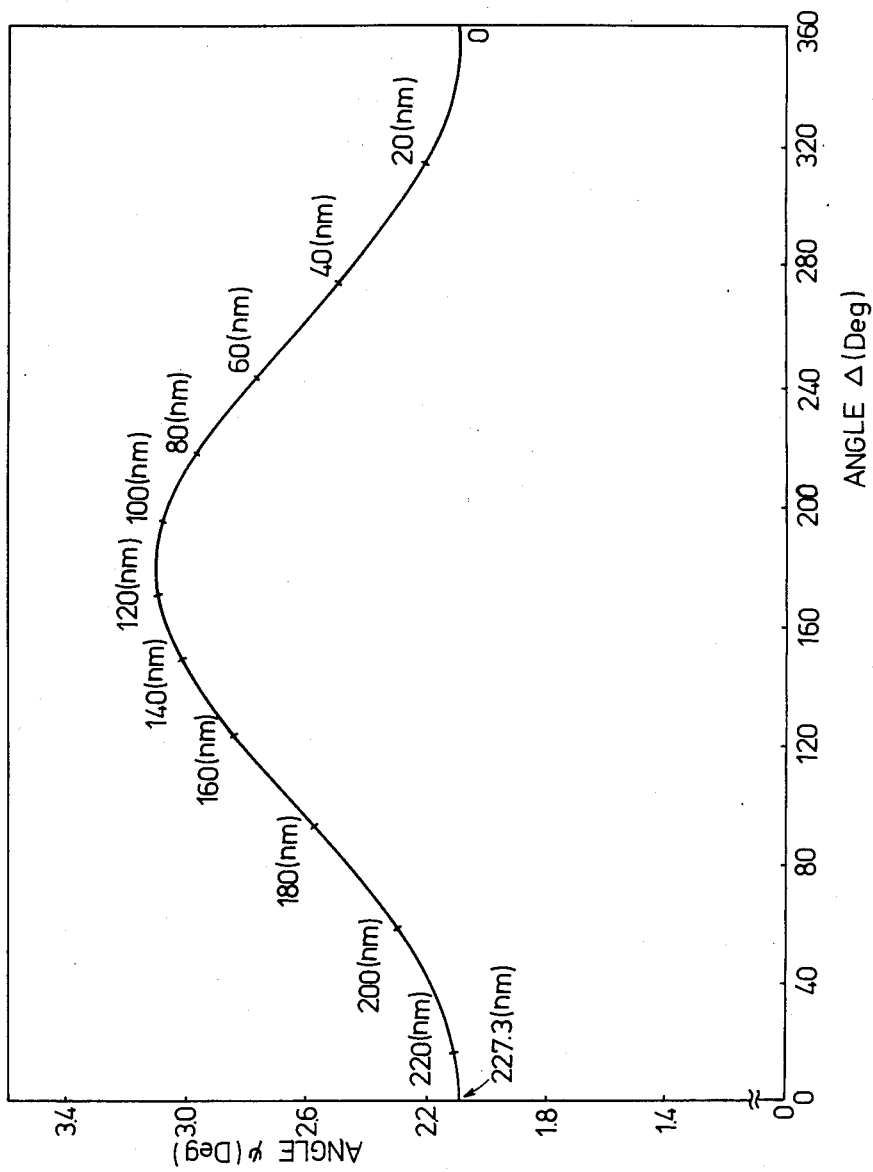
FIG. 4 shows the relationships of the angle of the phase difference and the angle describing the amplitude ratio of two polarized light components and the film thickness obtained in the film thickness measuring apparatus according to the present invention.

When the incident angle $\theta_0$ is selected equal to or approximately equal to the polarizing angle $\theta_b$ of the transparent film 12, the relationships of the angles Δ and ψ and the film thickness d can be plotted as shown in FIG. 4. FIG. 4 shows a case where the refractive index of the transparent substrate 11 made of glass is equal to 1.52, the refractive index n of the transparent film 12 of photoresist is equal to 1.63, and the incident angle $\theta_0$ is equal to 58° which is approximately equal to the polarizing angle $\theta_b$ (58.47°) of the transparent film 12. As may be seen from FIG. 4, the film thickness d is distributed in an extremely gently-sloping mountain-shape throughout the entire range (0° to 360°) of the angle Δ. Accordingly, when the value of the angle Δ is obtained in the analyzer 30, it is possible to immediately obtain the film thickness d from the value of the angle Δ. In FIG. 4, the rate of change of the film thickness d with respect to a change in the angle Δ is small compared to that in FIG. 3 as may be readily seen by comparing FIGS. 3 and 4, and for this reason, it is possible to obtain the film thickness with a high accuracy. The measurement of the angle ψ describing the ordinate is slightly difficult compared to the conventional apparatus because of the small value of the angle ψ, however, no problems are introduced since only the angle Δ needs to be measured in order to obtain the film thickness and the angle ψ is not required.

Further, as may be understood by comparing FIGS. 3 and 4, the angle ψ in the ordinate is shown on an enlarged scale in FIG. 4. For this reason, the plots of the film thickness appears to form a mountain-shape, but the plots actually form a substantially linear line when the plots are made on the same scale as the ordinate in FIG. 3.

The reason why the relationships of the angles Δ and ψ and the film thickness d become as shown in FIG. 4, is assumed to be for the following reasons. The amplitude reflectance of the polarized light component in the direction S has the same positive or negative value with respect to the incident angle, but the amplitude reflectance of the polarized light component in the direction P has a value with the positive or negative sign thereof reversed at the boundary of the polarizing angle with respect to the incident angle. Accordingly, when the incident angle $\theta_0$ is selected equal to or approximately equal to the polarizing angle $\theta_b$, the angle Δ of the phase difference of the polarized light components in the directions P and S of the reflected light becomes sensitive with respect to the film thickness.

When the deviation of the incident angle $\theta_0$ from the polarizing angle $\theta_b$ becomes large, the slope of the mountain-shape becomes steeper. As the deviation of the incident angle $\theta_0$ from the polarizing angle $\theta_b$ becomes much larger, the plots shown in FIG. 4 form a part of an oval and finally assumes the form of an oval. Thus, the practical range of the deviation of the incident angle $\theta_0$ from the polarizing angle $\theta_b$ in the present invention should be in such a range that the value of the incident angle $\theta_0$ is ±1.5° with respect to the polarizing angle $\theta_b$.

Figure 5A:
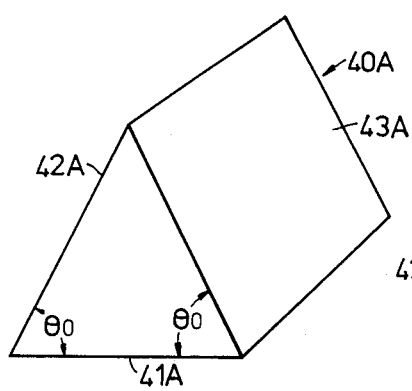
FIGS. 5A and 5B are perspective views respectively showing an embodiment and a modification of an adjusting instrument which is used to adjust the incident angle in the apparatus according to the present invention.
Figure 5B:
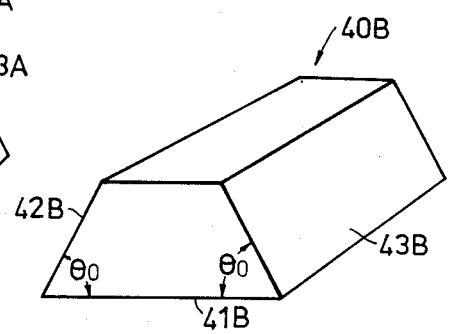

Next, a description will be given with respect to an adjusting instrument for setting the incident angle $\theta$ to the measuring plate 10 to the incident angle $\theta_0$ described before. In FIG. 5A, an adjusting instrument 40A is made from a medium having isotropy such as optical glass, and has a cross section of an isosceles triangular shape. The adjusting instrument 40A comprises two side surfaces 42A and 43A each forming an angle $\theta_0$ with respect to a bottom surface 41A, which angle $\theta_0$ is equal to the incident angle $\theta_0$ which is to be set. The adjusting instrument may have a cross section of an isosceles trapezoidal shape as in the case of an adjusting instrument 40B shown in FIG. 5B. In FIG. 5B, those parts which correspond to the parts in FIG. 5A are designated by the same reference numerals with a "B"

instead of the "A". The surfaces 41A, 42A, 43A, 41B, 42B, and 43B are optical surfaces which are abrasively polished.

Figure 6:
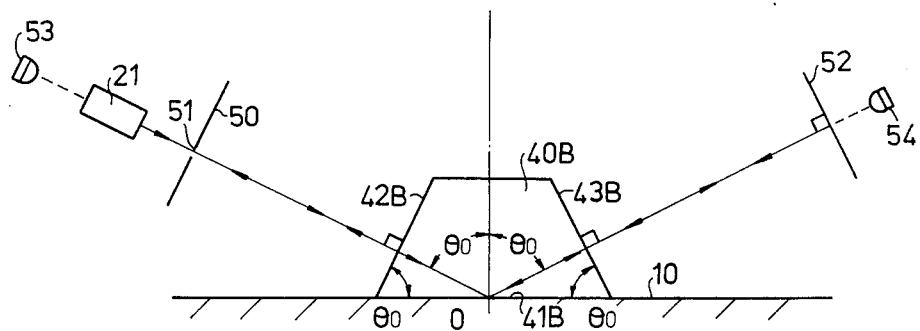
FIG. 6 is a schematic diagram for explaining the incident angle measuring state when adjusting the incident angle by use of the adjusting instrument shown in FIG. 5B.

When performing the adjustment, the adjusting instrument 40B (or 40A) is placed on the measuring plate 10 as shown in FIG. 6. In FIG. 6, the illustration of the λ/4 plates 22 and 24 and the polarizer 23 are omitted. The light from the light source 21 is passed through a pin hole 51 of a pin hole plate 50 and is impinged on the adjusting instrument 40B. The incident light to the adjusting instrument 40B is reflected by the surface of the measuring plate 10 at a point O, directed out of the adjusting instrument 40B, and directed towards a reflecting mirror 52 which is disposed parallel to the side surface 43B of the adjusting instrument 40B. When the incident angle of the light impinging on the measuring plate 10 from the light source 21 is correctly set to the angle $\theta_0$ described before, the light from the light source 21 will impinge on the side surface 42B of the adjusting instrument 40B perpendicular to the side surface 42B, be reflected by the measuring plate 10, be directed out of the side surface 43B of the adjusting instrument 40B perpendicular to the side surface 43B, and impinge perpendicularly to the reflecting mirror 52 and be reflected perpendicularly thereby. Hence, the reflected light from the reflecting mirror 52 will travel through the same optical path in the reverse sequence, and be reflected by the measuring plate 10 to finally reach the light source 21.

A part of the light impinging on the adjusting instrument 40B from the light source 21 is reflected by the side surface 42B. However, unless the incident angle of the light impinging on the measuring plate 10 from the light source 21 is equal to the angle $\theta_0$, the reflected light from the side surface 42B will form a spot on the pin hole plate 50 at a position other than the position of the pin hole 51. Similarly, unless the incident angle of the light impinging on the adjusting instrument 40B from the light source 21 is equal to the angle $\theta_0$, the light which is reflected by the measuring plate 10 and the reflecting mirror 52 and again directed towards the pin hole plate 50 will form a spot on the pin hole plate 50 at a position deviated from the pin hole 51. On the other hand, when the incident angle of the light impinging on the adjusting instrument 40B from the light source 21 is correctly set to the angle $\theta_0$, the reflected light from the side surface 42B and the reflecting mirror 52 is will pass through the pin hole 51 and return again to the light source 21. For example, a HeNe laser described before is used as the light source 21, because the oscillation output of the HeNe laser is not fed back so as to stabilize the output thereof as in the case of a semiconductor laser. As a result, when the reflected light is returned to the light source 21, the output of the light source 21 is amplified due to self-coupling. For example, it has been experimentally confirmed that the output of the light source 21 is amplified by an order of 5% to 10% when 4% of the oscillation output is returned to the light source 21 as the reflected light.

Accordingly, a light receiving element 53 is disposed behind the light source 21. Generally, a reflecting mirror provided at the rear of the light source 21 does not reflect 100% of the light, and for example, 0.1% of the light is transmitted behind the light source 21. The light receiving element 53 detects the transmitted light from the rear of the light source 21. When the reflected light reaches the light source 21 and the oscillation output of the light source 21 is amplified as described before, the luminous intensity of the light received by the light receiving element 53 also increases, and it is hence possible to detect that the reflected light has reached the light source 21. Therefore, the incident angle of the light impinging on the measuring plate 10 from the light source 21 can be adjusted to become equal to the angle $\theta_0$ by adjusting the mounting angle of the light source 21 so that the luminous intensity of the light received by the light receiving element 53 increases.

Instead of using the light receiving element 53, it is possible to use a half mirror as the reflecting mirror 52 and provide a light receiving element 54 behind the half mirror. In this case, the incident angle of the light impinging on the measuring plate 10 from the light source 21 can be adjusted to become equal to the angle $\theta_0$ by adjusting the mounting angle of the light source 21 so that the luminous intensity of the light received by the light receiving element 54 becomes a maximum.

The adjusting instrument is removed when the adjustment described heretofore is completed.

Further, the present invention is not limited to these embodiments, but various variations and modifications may be made without departing from the scope of the present invention.

What is claimed is:

1. A method of adjusting an incident angle $\theta_0$ in a film thickness adjusting apparatus, said film thickness measuring apparatus comprising: a light source for impinging light on a measuring plate with the incident angle $\theta_0$, said measuring plate comprising a transparent film on top of a transparent substrate, said transparent film having a film thickness which is to be measured by said film thickness measuring apparatus; a light receiving system for receiving and detecting light which is impinged on said measuring plate and is reflected thereby; and an analyzer system responsive to an output of said light receiving system for measuring an angle Δ of the phase difference between two polarized light components of the reflected light from said measuring plate and for calculating the film thickness of said transparent film from said angle Δ of the phase difference, said method comprising the steps of:

placing an adjusting instrument on said measuring plate so that a bottom surface of said adjusting instrument rests on said measuring plate, said adjusting instrument comprising first and second side surfaces each forming a predetermined angle $\theta_0$ with respect to the bottom surface thereof, said predetermined angle $\theta_0$ being equal to a polarizing angle $\theta_b$ of said transparent film of said measuring plate, said first side surface of said adjusting instrument opposing to said light source;

positioning a reflecting mirror to be parallel to said second side surface of said adjusting instrument; and adjusting the angle of light traveling from said light source toward said measuring plate so that light emitted from said light source and reflected by the said first side surface of said adjusting instrument and/or light emitted from said light source, passed through said adjusting instrument and reflected by said measuring plate and said reflecting mirror returns to said light source.

2. A method as claimed in claim 1 in which said method further comprises the steps of detecting a luminous intensity of a light which is transmitted from a rear of said light source, and adjusting the angle of light travelling from said light source toward said measuring plate so as to detect an increase in the luminous intensity of the light which is transmitted from the rear of said light source.

3. A method as claimed in claim 1 in which said adjusting instrument is made of optical glass having isotropy and has a cross section of an isosceles triangular shape or an isosceles trapezoidal shape.

4. A film thickness measuring apparatus as claimed in claim 1 in which said transparent substrate of said measuring plate comprising a transparent glass substrate having a refractive index of 1.52, said transparent film comprising a photoresist film having a refractive index n of 1.63, said polarizing angle $\theta_b$ of said transparent film being described by $\tan^{-1} n$, and said incident angle $\theta_0$ of the light from said light source with respect to said measuring plate being selected equal to 58°.

5. A film thickness measuring apparatus as claimed in claim 1 in which said analyzer system being further responsive to an angle $\psi$ describing an amplitude ratio $\tan \psi$ of the two polarized light components, and a film thickness which are in such a relationship with each other that said film thickness is distributed throughout all angles of 0° to 360° of said angle $\Delta$ in the coordinate when said angle $\Delta$ is taken along the abscissa and said angle $\psi$ is taken along the ordinate.

* * * * *